J. MORRISON.
COMBINED MOTOR AND ANIMAL DRAFT VEHICLE.
APPLICATION FILED JUNE 28, 1920.
1,396,652.
Patented Nov. 8, 1921.
5 SHEETS—SHEET 1.
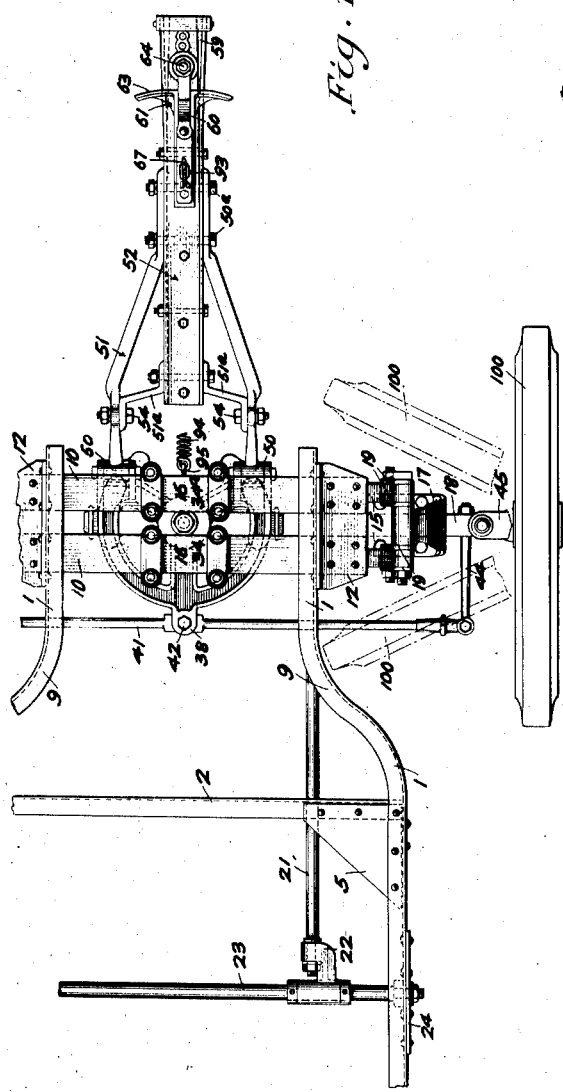
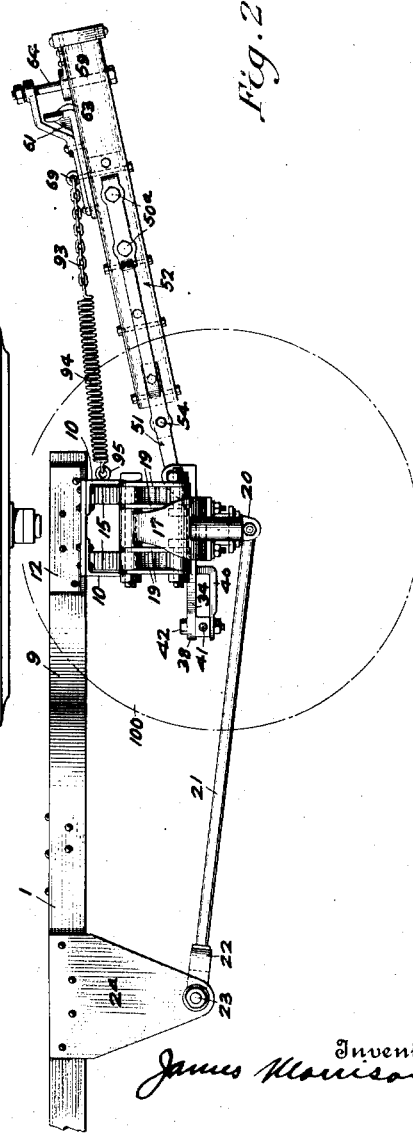

J. MORRISON.
COMBINED MOTOR AND ANIMAL DRAFT VEHICLE.
APPLICATION FILED JUNE 28, 1920.
1,396,652.
Patented Nov. 8, 1921.
5 SHEETS—SHEET 2.
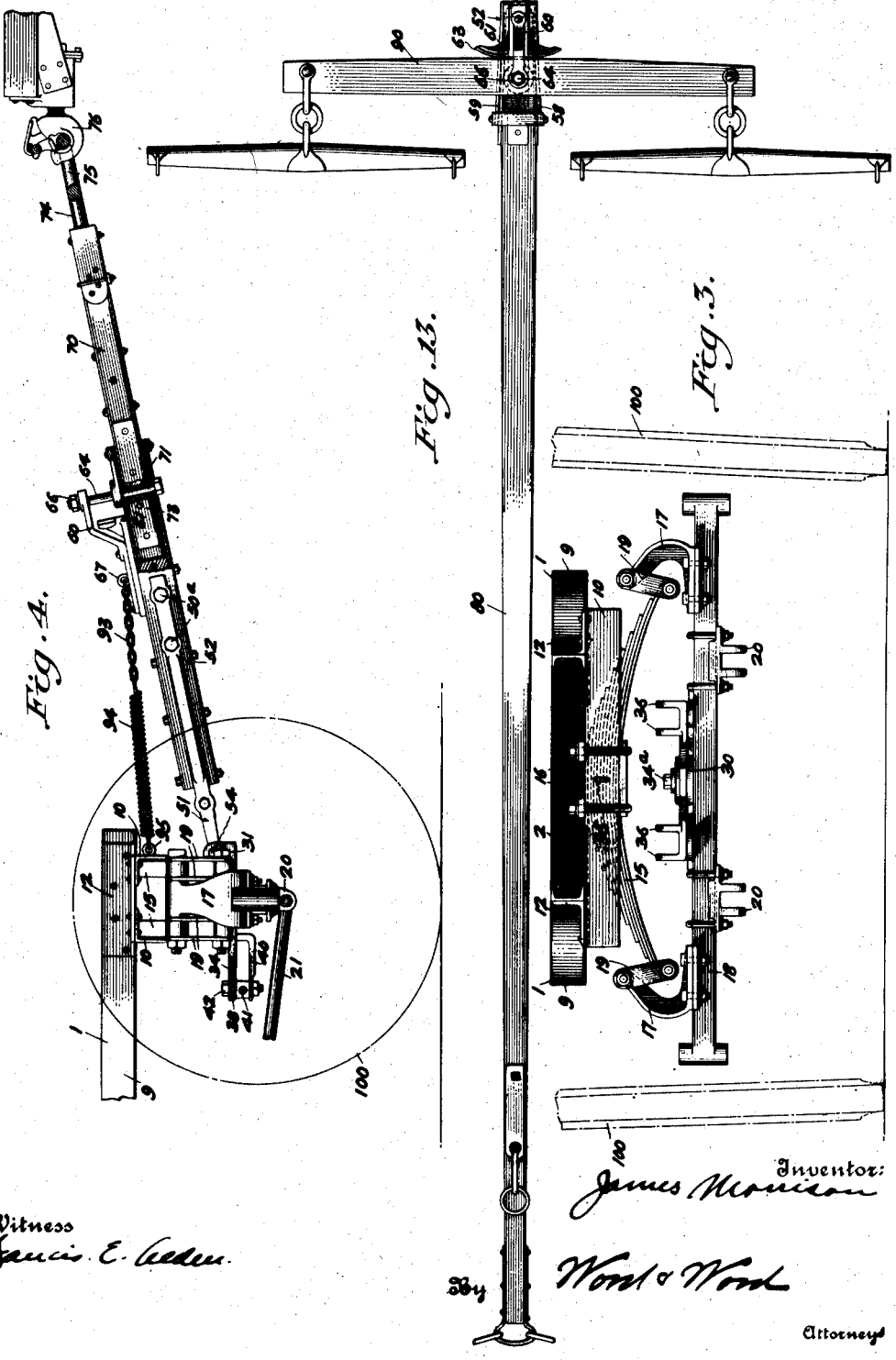

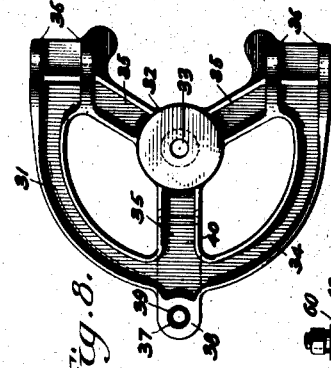

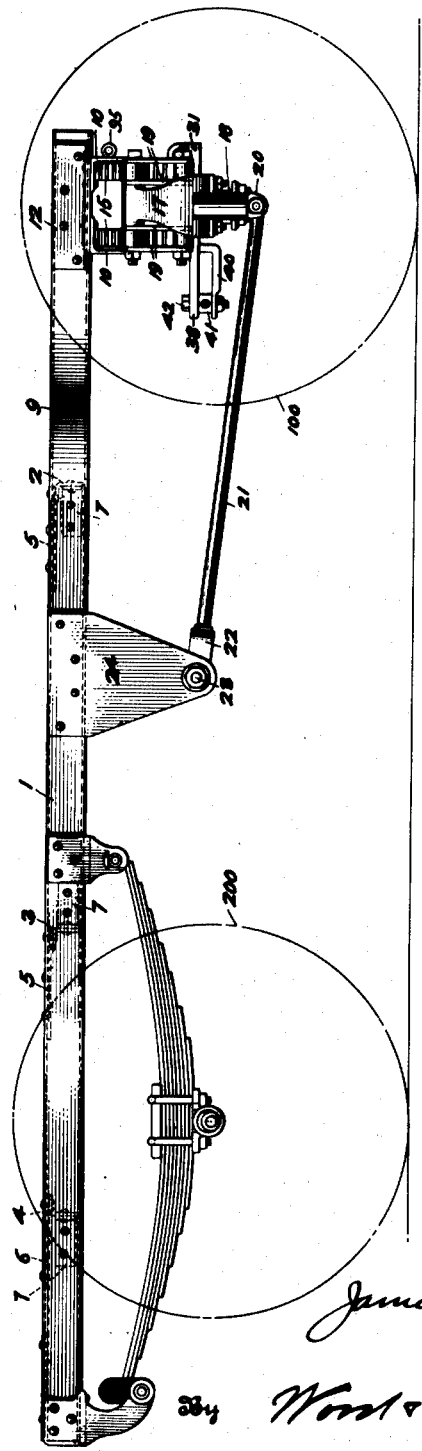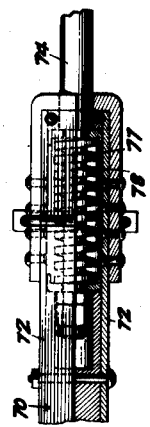

UNITED STATES PATENT OFFICE.

JAMES MORRISON, OF CINCINNATI, OHIO, ASSIGNOR TO THE TRAILMOBILE COMPANY, OF OAKLEY, CINCINNATI, OHIO, A CORPORATION OF OHIO.

COMBINED MOTOR AND ANIMAL-DRAFT VEHICLE.

1,396,652.     Specification of Letters Patent.     Patented Nov. 8, 1921.

Application filed June 28, 1920. Serial No. 392,214.

*To all whom it may concern:*

Be it known that I, JAMES MORRISON, a citizen of the United States, and residing at Cincinnati, in the county of Hamilton and State of Ohio, have invented a new and useful Improvement in Combined Motor and Animal-Draft Vehicle, of which the following specification is a full disclosure.

My invention relates to a new construction of vehicle adapted to be either truck or horse drawn.

As a result of the development of the trailer art and its rapidly increasing usage and adoption as a partial substitute for horse drawn wagons, there exists today two distinct types of vehicles, the trailer and the conventional wagon, non-interchangeable, and constituting two distinct species. Occasionally conditions are met to which the trailer is not adapted, while the wagon type is, more notably sharp turns, beyond the steerage limitations of a trailer.

On the other hand, the trailer has supplied a need for rapid transportation of heavy loads for long distances, and a stanch vehicle which can be drawn and steered by motor trucks, for which purpose the conventional wagon structure is wholly unadapted.

The present need is therefore for an intermediate type of convertible vehicle, combining those characteristics of the trailer and the wagon, which will enable it to be alternatively drawn by motor truck or horse, depending upon transportation conditions and its exigencies, and in which will inhere the advantages and capacities of trailer transportation, namely, a structure and lubrication provision adapted for high and constant speeds, for long journeys and for shock absorption, and having the greater steerage radius of a wagon structure.

It is therefore the object of my invention to produce a vehicle of the trailer type, but combining such principles of the wagon structure and function as to be readily and conveniently convertible, to practically serve this demand and provide a vehicle stanch enough to function as a trailer and yet light enough for horse draft on occasion, the same retaining the principle of trailer steerage, but eliminating the trailer limitations of steerage, and in which the trailer will not be rendered liable to breakage or disorganization when functioning as a horse-drawn vehicle.

Other objects and certain advantages will be pointed out in the description of the drawings, forming a part of this specification, in which:

Figure 1 is a fragmentary plan of the chassis of the improved trailer, showing the mounting of the same relative to the front axle, and showing the socket for the reception of the draw-bar and wagon-pole.

Fig. 2 is a side elevation of the structure shown in Fig. 1.

Fig. 3 is a front elevation of the structure shown in Figs. 1 and 2, the socket having been removed.

Fig. 4 is a fragmentary side elevation, similar to Fig. 2, showing the draw-bar in place in the socket and showing the lunette of the draw-bar in engagement with a standard pintle carried by the frame of the draft vehicle.

Fig. 5 is a detail plan of the socket.

Fig. 6 is a side view of the structure shown in Fig. 5.

Fig. 7 is an end elevation of the flared end of the socket.

Figs. 8 and 9 are respectively a detail plan and side view of the steering plate.

Figs. 10 and 11 are a detail side elevation and plan view respectively of the draw-bar.

Fig. 12 is a detail plan of the wagon-pole.

Fig. 13 is a view similar to Fig. 12, showing the wagon-pole in its operative position within the socket, and showing the double and swingle trees properly mounted in relation to the said socket and wagon-pole.

Figs. 14 and 15 are respectively a plan and side elevation of the chassis and mounting therefor.

Fig. 16 is a detail of the outer end of the draw-bar.

Figure 14:
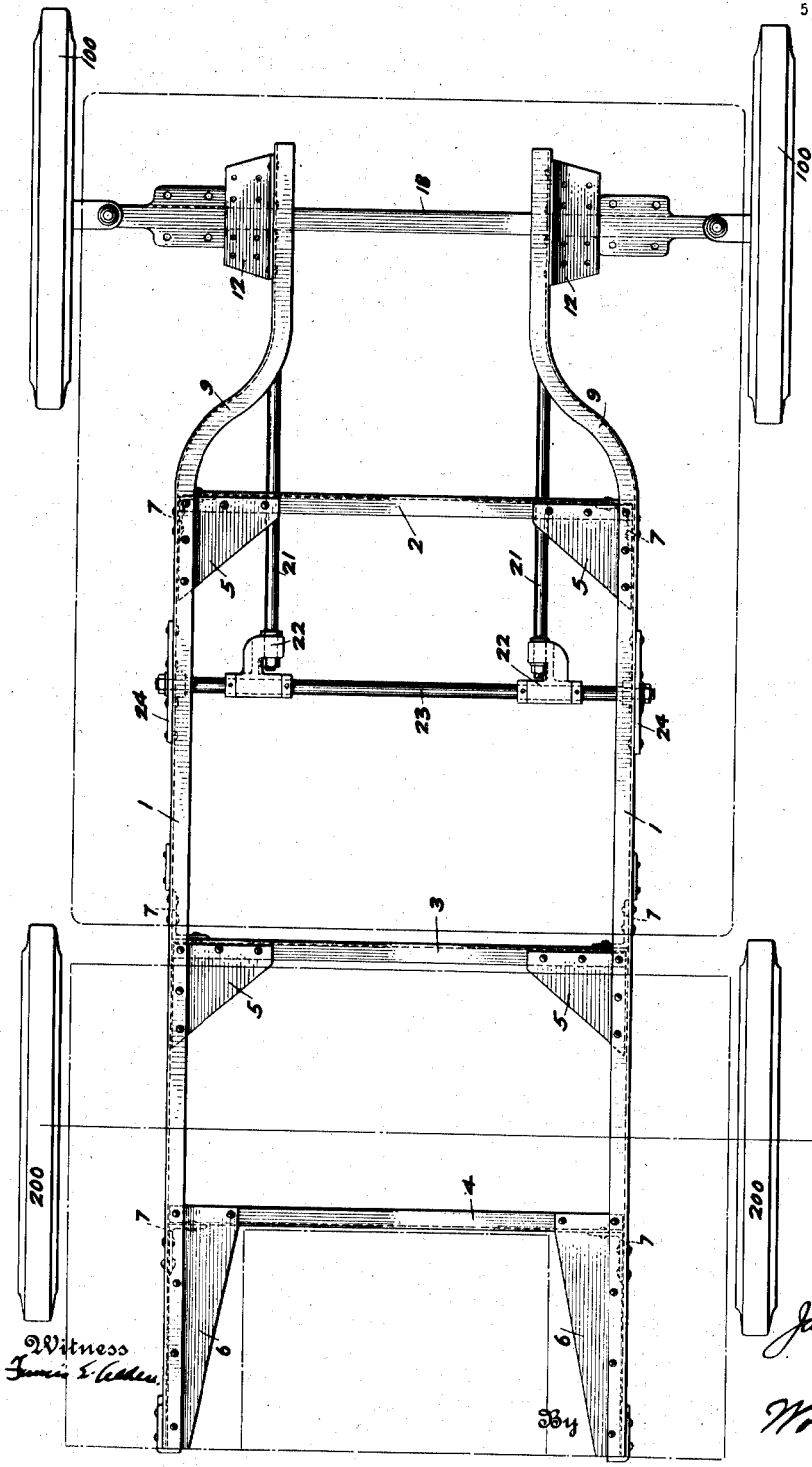

Referring particularly to Figs. 1, 2, 3, 14 and 15, the chassis is composed of side channel-irons 1, connected by transverse angle-irons 2, 3, 4, the said angle-irons and side channel-irons being braced by gusset plates 5, 6, and by angle-brackets 7, as shown. The front end of the chassis is contracted by reversely bending the side channel-irons as at 9. Crosswise of the outer contracted portion of the chassis are placed two springreceiving L-irons 10, the same being securely attached by angle-brackets 12. The front springs 15, (see Fig. 3), are placed within the said irons 10 and fastened as at 16 by clip-bolts and plates. Hangers 17 are mounted upon the axle 18, and links 19 are fastened respectively to the hangers 17 and to the ends of the springs 15. These front springs, at the contracted end of the chassis, are parallel to the front axle, and occupy a space between the pivotal mountings of the steering wheels.

Radius-rod clips are provided as at 20 upon the axle 18, and radius-rods 21 are connected therewith, the opposite ends of the said radius-rods being stepped in bearings 22, mounted upon a transverse shaft 23, the said shaft having a rigid connection to the chassis through the means of plates 24.

Centrally of the axle 18 is placed and suitably secured, a steering-plate seat 30, and mounted thereupon is the steering-plate 31, (see Figs. 8 and 9). The plate 31 has a hub portion 32, provided with a central opening 33, through which extends a bolt 34$^a$, rotatably attaching the steering-plate upon the steering-plate seat 30, and to the axle 18. A semi-circular portion 34, concentric with the hub portion 32, and attached to the same by arms 35, extends rearwardly of said hub portion, and the said semi-circular portion 34 at its front terminals has formed thereon upstanding ears 36, providing pivotal attachment means for the ends 50, of the fork 51, of the socket generally designated at 52 (see Figs. 5 and 6). An opening 37, in a lug 38, at the rear of the semi-circular portion 34, is vertically alined with a similar opening 39, of an arm 40, integral with and extending from the under face of the said portion 35, the steering reach-rod 41 being pivoted as at 42, between the under face of the said portion 34 and the arm 40, and the said reach rod has the usual connection 44 with the steering knuckle 45. The socket, generally designated at 52, is pivotally attached through the means of the fork 51, the ends 50 of said fork, and bolts 54, to the ears 36 of the steering-plate 31.

The construction of the socket 52 is as follows:

Two angle-irons 55 are placed about a wood filler 56, and fastened thereto by cross-bolts 57, (see Figs. 5 to 7 inclusive). The forward ends of the said angle-irons 55, are bent outwardly as at 58, to form a flared pocket 59, for the reception of the end of the draft-bar 70 or of the end of the wagon-pole 80, a strap being riveted about the ends of the said angle irons 55, to hold the same in their flared position; the end of the wood filler 56 forming a stop to limit the rearward movement of the draft-bar 70, or of the wagon-pole 80, when either is inserted into the pocket 59, to thus insure the alinement of the openings 71 or 81 of respectively the draft-bar or wagon-pole, with the bolt openings of a hammer-strap and of a whiffle-tree plate, hereinafter described.

The hammer-strap 60 is attached by rivets to a whiffle-tree stop 61, the said stop consisting of a flat attachment portion 62, at a right angle to the transverse stop portion 63. The whiffle-tree 90 engages the stop portion 63, to prevent undue oscillation of the same about the bolt 64. The bolt 64 extends through an opening in the bottom of the lower angle-iron 55, through the openings 71 or 81, of the draft-bar or of the wagon-pole, through the upper angle-iron 55, through a whiffle-tree plate 65, whiffle-tree 90, and through an opening in the hammer-strap 60, and is held by a washer and nut 66.

An eye-bolt 67 traverses the portion 68 of the hammer strap 60, double-tree stop, angle-irons 55 and wood filler 56, the eye 69 of the same being designed to connect with a tension means, hereinafter described.

Brackets 51$^a$ securely brace and fasten the arms of the fork 51 to the socket 52, and the forward ends of the said fork are securely bolted as at 50$^a$ to the socket.

The draw-bar 70 (see Figs. 10 and 11), is preferably constructed of wood and is reinforced by steel plates 72, and contiguous to the openings 71 is further provided with wear plates 73, the opening in these plates registering with the opening 71. At its forward end, the draw-bar is provided with a pintle-bar 74, terminating in a lunette 75, for connection with a standard pintle 76, (see Fig. 4), attached to the draft vehicle. The pintle-bar 74, at its rear, projects into an opening 77 in the draw-bar, and is surrounded by a shock-absorbing spring 78 mounted as shown in Fig. 16.

The wagon-pole 80 is of the ordinary type and its socket-engaging end is similar in construction to that of the draw-bar.

Socket supporting tension means, consisting of a section of chain 93, is attached at one end to the eye 69 fixed to the socket or steering draft tongue 52. The opposite end of the chain connects with one end of a spring 94, which spring connects, at its opposite end, with an eye 95, projecting centrally from the frame cross angle iron 10. This spring and chain yieldingly ties the steering draft tongue 52 in an upright position.

The rear springs, (Fig. 14) are transverse to the axle.

The front steering wheels 100 and the rear wheels 200 are respectively in alinement, the front wheels being steered by the draw-bar, and being enabled, because of the contracted front end of the chassis, the front axle, parallel spring and the laterally extended pivotal mountings of the wheels, to make very sharp turns, (see Fig. 1), without disarranging the draft-bar steerage, or endangering any of the structural parts.

Thus the structure lends itself admirably to a readily convertible trailing or animal draft vehicle, providing for the animal draft use a wheel swing of fifty or greater degree from the normal straight ahead position, to give sufficient capacity for a short turning and for sidewise lunging of the team in starting to pull a heavy load or over rough roads.

That is to say, the invention provides all the desirable structural capacities of a trailer, with the greater steering radius of a wagon, stanch enough for all trailer purposes, light enough to be horse drawn, and convertible by the simple and sole act of substituting a wagon tongue for a truck coupler.

Having described the invention, I claim:

1. In a vehicle, a structural iron, built-up frame, having a reduced width front end, a front axle, a semi-elliptical leaf spring extending longitudinally with the axle between the axle and frame, having its opposite ends pivotally connected to the axle and intermediately connected to the frame and centrally thereof, wheel carrying stub axles pivotally mounted to the opposite ends of said axle, a wheel steering fifth wheel swiveled centrally upon said axle and connecting with said stub axles, a draft bar pivotally connecting with said fifth wheel, a cross-rod connecting with the opposite sides of said frame, and a pair of parallel brace-rods pivotally connecting with said axle and cross-rod.

2. A vehicle of the trailer type convertible for horse draft, combining a trailer chassis having a contracted steering end, a front axle at the end projected laterally beyond the non-contracted portions of the chassis, providing a clearance, enabling relatively sharp curve steerage, steering wheels pivotally mounted on the outer ends of said axle, body springs supported upon and parallel with the axle between the pivotal wheel mountings, a draft-bar operatively connected to the steering wheels, a cross-rod connecting with opposite sides of said chassis frame in rear of the contracted steering end, a pair of spaced parallel radius rods, having their opposite ends respectively pivotally connecting with said axle and frame cross rod.

3. In a vehicle of the trailer type convertible for horse draft, the combination of a chassis formed with a contracted front steering-end, a front axle laterally extended in relation to the contracted end, providing a relatively large arc of steerage, wheels pivotally mounted on said axle ends, semi-elliptical body springs parallel with the axle, hangers on the axle within the pivotal wheel mountings, supporting said springs, a steering plate rotatively mounted on the axle between said hangers, a combined steering and draft-bar projected from said plate, reach rods from said plate to said wheels, a cross-rod dependingly connecting with opposite sides of said frame, a pair of spaced parallel radius rods extending in the line of draft and hingedly connecting said axle and frame cross-rod.

4. A trailer adapted for animal draft, comprising a frame, a front axle having wheel journaled steering spindles at its opposite ends, a spring connecting the frame and axle, extending longitudinally with the axle and between axle and frame, the frame at its front end being of a reduced width to provide for an animal draft fifty or greater degree swing of the wheels from their normal straight ahead position, a wheel steering fifth wheel swiveled upon the axle and connecting with said wheel steering spindles, a draft bar pivotally connected with said fifth wheel and a pair of parallel brace rods extending lengthwise of the frame pivotally connecting with said axle and frame.

5. A trailer adapted for animal draft comprising a frame, a front axle having wheel journaled steering spindles at its opposite ends, springs connecting the frame and axle, the frame at its front end being of a reduced width to provide for an animal draft fifty or greater degree swing of the wheel from their normal straight ahead position, a wheel steering fifth wheel swiveled centrally upon the axle and connecting with said wheel steering spindles, a draft bar pivotally connected with said fifth wheel and a pair of brace rods pivotally connecting with said axle and frame, and extending lengthwise of the frames and within the frame reduced width area.

In witness whereof, I hereunto subscribe my name, as attested by the two subscribing witnesses.

JAMES MORRISON.

Witnesses:
L. A. BECK,
J. C. JUNIUS.